US009350211B2

(12) United States Patent
Tanaka et al.

(10) Patent No.: US 9,350,211 B2
(45) Date of Patent: May 24, 2016

(54) ROTATING ELECTRIC MACHINE

(71) Applicant: Mitsubishi Electric Corporation, Chiyoda-ku, Tokyo (JP)

(72) Inventors: Kazunori Tanaka, Chiyoda-ku (JP); Kazuya Hasegawa, Chiyoda-ku (JP); Shintaro Shimizu, Chiyoda-ku (JP); Atsushi Oohashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 399 days.

(21) Appl. No.: 14/057,298

(22) Filed: Oct. 18, 2013

(65) Prior Publication Data
US 2014/0354097 A1 Dec. 4, 2014

(30) Foreign Application Priority Data
Jun. 3, 2013 (JP) ................................. 2013-116649

(51) Int. Cl.
*H02K 5/16* (2006.01)
*H02K 5/173* (2006.01)

(52) U.S. Cl.
CPC .................................... *H02K 5/1732* (2013.01)

(58) Field of Classification Search
None
See application file for complete search history.

(56) References Cited

U.S. PATENT DOCUMENTS

| 4,980,587 A | * | 12/1990 | Yonei | .................... | F16C 19/54 |
| | | | | | 310/67 R |
| 5,459,361 A | * | 10/1995 | Morioka | ................ | H02K 5/124 |
| | | | | | 310/67 R |
| 5,735,615 A | * | 4/1998 | Pontzer | .................... | F16C 35/00 |
| | | | | | 384/476 |
| 6,030,128 A | * | 2/2000 | Pontzer | .................... | F16C 35/00 |
| | | | | | 384/476 |

FOREIGN PATENT DOCUMENTS

| JP | 63-28882 U | 2/1988 | | |
| JP | 02-179239 A | 7/1990 | | |
| JP | 05-071453 A | 3/1993 | | |
| JP | 6-60270 U | 8/1994 | | |
| JP | 07158647 A | * 6/1995 | ............. | H02K 5/173 |
| JP | 2004248469 A | * 9/2004 | ............... | H02K 5/16 |
| WO | 2013/121555 A1 | 8/2013 | | |

OTHER PUBLICATIONS

PCT pending application PCT/JP2012/004480, filed Jul. 11, 2012.
Communication dated Jul. 22, 2014, issued by the Japanese Patent Office in counterpart Japanese application No. 2013-116649.

* cited by examiner

*Primary Examiner* — Tran Nguyen
(74) *Attorney, Agent, or Firm* — Sughrue Mion, PLLC

(57) ABSTRACT

To obtain a rotating electric machine with a simple configuration, including a clearance filling member which can be easily assembled to a bearing housing portion without requiring time and does not adversely affect an outer race of a bearing, provided is an AC generator for a vehicle including a resin case (26) including: a case main body portion (30); an extending portion (32) formed integrally with the case main body portion (30), the extending portion (32) extending toward a rotor (6) beyond an end surface of the counter drive-side bearing (25) housed inside the counter drive-side bearing housing portion (24); and a convex portion (33) formed on an outer circumferential surface of the extending portion (32), the convex portion (32) being configured to be held in pressure contact with the inner circumferential wall surface of the counter drive-side bearing housing portion (24).

13 Claims, 5 Drawing Sheets

ROTATING ELECTRIC MACHINE

BACKGROUND OF THE INVENTION

1. Field of the Invention

The present invention relates to a rotating electric machine including a bearing for rotationally supporting a rotor, which is housed inside a bearing housing portion of a bracket, such as an AC generator for a vehicle to be mounted in a vehicle.

2. Description of the Related Art

There is conventionally known the following rotating electric machine. Specifically, the rotating electric machine includes a bracket and a clearance filling member. A bearing housing portion for housing a rolling bearing therein is integrally formed with the bracket. The clearance filling member is provided between an outer race of the rolling bearing and the bearing housing portion, and is made of a material having a larger thermal expansion coefficient than that of the bracket (for example, see Japanese Patent Application Laid-open No. 7-158647 (paragraph).

In the rotating electric machine, a cutout portion is provided to the clearance filling member so as to facilitate elastic deformation. At the same time, a projecting portion is formed on an outer circumference of the clearance filling member. The projecting portion is locked to a concave portion formed on an inner circumferential surface of the bearing housing portion to restrict the rotation of the clearance filling member relative to the bearing housing portion.

In the rotating electric machine having the configuration described above, the cutout portion and the projecting portion are required to be provided to the clearance filling member in order to restrict the rotation of the clearance filling member relative to the bearing housing portion and house the clearance filling member inside the bearing housing portion. Thus, the clearance filling member has a complex configuration. In addition, when the clearance filling member is mounted inside the bearing housing portion, the projecting portion is required to be locked to the concave portion formed on the inner circumferential surface of the bearing housing portion. Thus, there is a problem in that long time is disadvantageously required for alignment between the projecting portion and the concave portion.

Moreover, there is another problem described below. The projecting portion of the clearance filling member may be deformed and displaced inwardly when the projecting portion is locked to the concave portion of the bearing housing portion. There is a fear in that such deformation and displacement of the projecting portion adversely affects the outer race of the bearing housed inside the bearing housing portion through an intermediation of the clearance filling member.

SUMMARY OF THE INVENTION

The present invention has been made to solve the problems described above, and therefore has an object to provide a rotating electric machine with a simple configuration, including a clearance filling member which can be easily assembled to a bearing housing portion without requiring time and does not adversely affect an outer race of a bearing.

According to one embodiment of the present invention, there is provided a rotating electric machine including:

a shaft;

a rotor fixed to the shaft;

bearings provided rotatably to the shaft on both sides of the rotor, for rotationally supporting the rotor; and a bracket including a bearing housing portion into which corresponding one of the bearings is pressed through an intermediation of a clearance filling member, in which the clearance filling member includes:

a filling-member main body portion having a cylindrical shape and having a radial thickness smaller than a clearance between an outer circumferential wall surface of an outer race of the corresponding one of the bearings and an inner circumferential wall surface of the bearing housing portion;

an extending portion formed integrally with the filling-member main body portion, the extending portion extending toward the rotor beyond an end surface of the corresponding one of the bearings housed inside the bearing housing portion; and a convex portion formed at at least one position on an outer circumferential surface of the extending portion to extend in a circumferential direction to form an arc-like shape, convex portion being configured to be brought into pressure contact with the inner circumferential wall surface of the bearing housing portion.

In the rotating electric machine according to the one embodiment of the present invention, the clearance filling member includes the convex portion which extends in the circumferential direction to have an arc-like shape on the outer circumferential surface of the extending portion extending toward the rotor beyond the end surface of the bearing housed inside the bearing housing portion toward the rotor, the convex portion being held in pressure contact with the inner circumferential wall surface of the bearing housing portion.

Thus, the clearance filling member may have a simple configuration and may be easily assembled to the bearing housing portion without requiring time and without adversely affecting the outer race of the bearing.

DETAILED DESCRIPTION OF THE PREFERRED EMBODIMENTS

Figure 1:
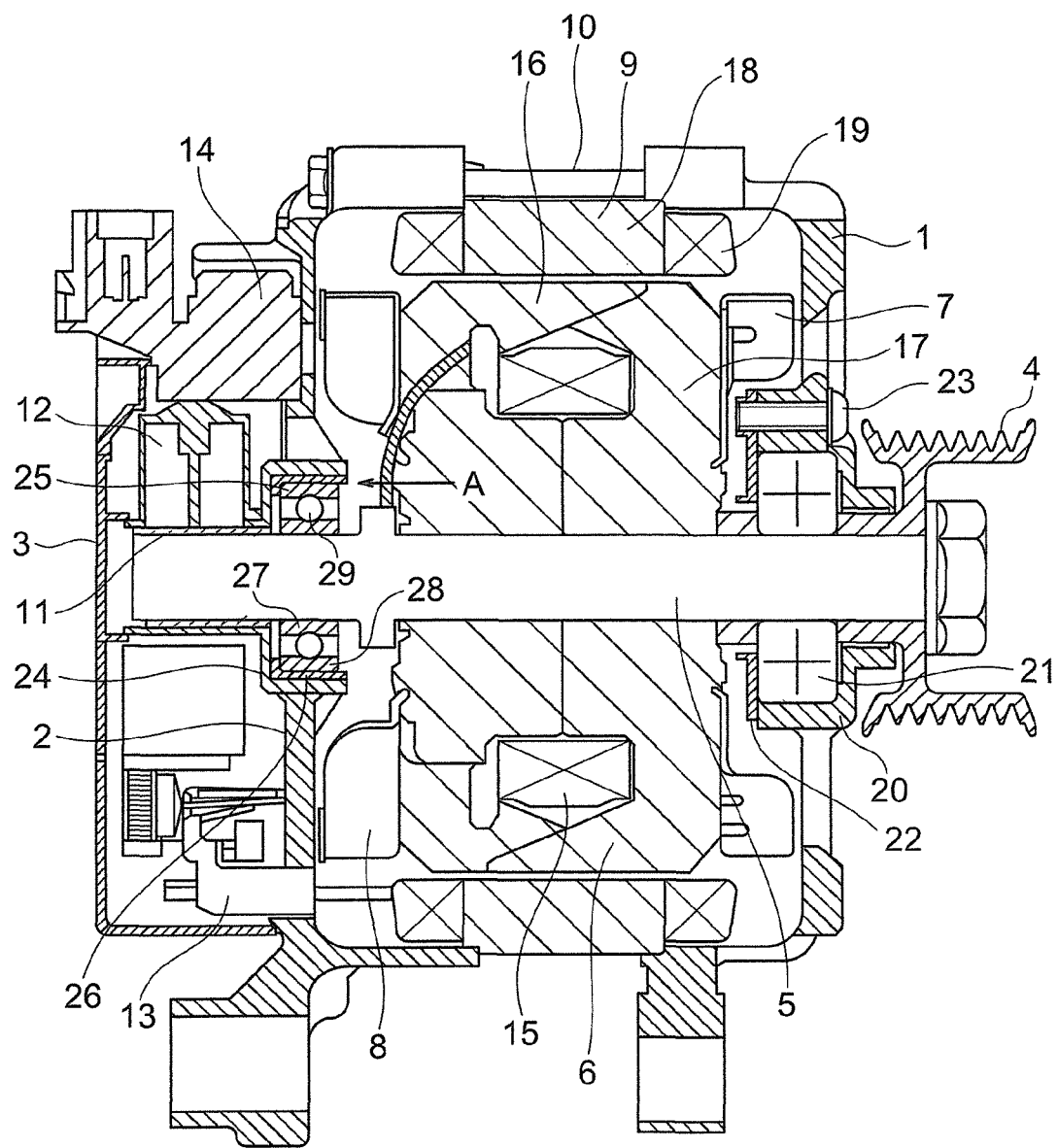
FIG. 1 is a sectional side view illustrating an AC generator for a vehicle according to a first embodiment of the present invention.

Referring to the accompanying drawings, embodiments of the present invention are described below. In the drawings, the same or corresponding components and parts are denoted by the same reference symbols.

First Embodiment

Figure 2:
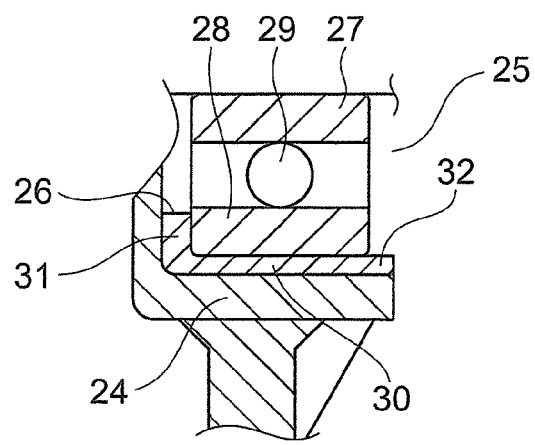
FIG. 2 is an enlarged view of a principal part of the AC generator for a vehicle illustrated in FIG. 1.

FIG. 1 is a sectional side view illustrating an AC generator for a vehicle according to a first embodiment of the present invention, and FIG. 2 is an enlarged view of a principal part of the AC generator for a vehicle.

The AC generator for a vehicle is a rotating electric machine. The AC generator for a vehicle includes a casing, a resin cover 3, a shaft 5, a rotor 6, a drive-side fan 7, a counter drive-side fan 8, and a stator 9. The casing includes a drive-side bracket 1 and a counter drive-side bracket 2. Each of the drive-side bracket 1 and the counter drive-side bracket 2 has an approximately bowl-like shape, and is made of aluminum. The resin cover 3 partially covers the counter drive-side bracket 2. The shaft 5 is provided on a center axis line of the casing. On one end of the shaft 5, a pulley 4 is fixed. The shaft 5 passes through the rotor 6 which is provided inside the casing. The drive-side fan 7 is mounted to a side surface of the rotor 6 on the drive-side bracket 1 side, whereas the counter drive-side fan 8 is mounted to a side surface of the rotor 6 on the counter drive-side bracket 2 side. The stator 9 is fixed to the casing so as to surround the rotor 6.

The stator 9 is fastened with a fastening force of a fastening bolt 10 from both sides by the drive-side bracket 1 and the counter drive-side bracket 2 so as to be interposed between the drive-side bracket 1 and the counter drive-side bracket 2.

The AC generator for a vehicle further includes a slip ring 11, a pair of brushes 12, a rectifier 13, and a voltage regulator 14. The slip ring 11 is mounted onto a portion of a surface of the shaft 5, which is located between the counter drive-side bracket 2 and the resin cover 3, and supplies a current to the rotor 6. The pair of brushes 12 slides against a surface of the slip ring 11. The rectifier 13 is electrically connected to the stator 9 so as to rectify an AC current generated in the stator 9 into a DC current. The voltage regulator 14 regulates an AC voltage generated in the stator 9.

The rotor 6 is a Lundell-type rotor. The rotor 6 includes a rotor coil 15, and a pair of claw-like magnetic poles 16 and 17. A magnetic flux is generated by the flow of an exciting current through the rotor coil 15. The claw-like magnetic poles 16 and 17 are provided so as to be opposed to each other to cover the rotor coil 15. By the magnetic flux generated by the rotor coil 15, magnetic poles are formed in the claw-like magnetic poles 16 and 17.

The stator 9 includes a stator core 18 and a stator coil 19. The stator core 18 has a cylindrical shape. The stator coil 19 is formed by winding a conductor in a slot (not shown) of the stator core 18. With the rotation of the stator 6, AC power is excited in the stator coil 19 by a change in magnetic flux generated by the rotor coil 15.

The stator coil 19 includes two sets of three-phase AC windings, each being obtained by Y-connection of three winding portions (not shown).

A drive-side bearing housing portion 20 is formed in a center portion of the drive-side bracket 1. A drive-side bearing 21 which rotatably supports the shaft 5 is pressed into and housed within the drive-side bearing housing portion 20. The axially inward movement of the drive-side bearing 21 is restricted by a retainer 22 which is fixed to the drive-side bracket 1 by a screw 23 so as to cover an opening of the drive-side bearing housing portion 20.

A counter drive-side bearing housing portion 24 is formed in the center portion of the counter drive-side bracket 2. A counter drive-side bearing 25 which rotatably supports the shaft 5 is mounted inside the counter drive-side bearing housing portion 24 through a resin case 26 having a cylindrical shape. The resin case 26 is a clearance filling member.

As illustrated in FIG. 2, the counter drive-side bearing 25 includes an inner race 27, an outer race 28, and a ball 29. The inner race 27 is firmly fixed to the shaft 5. The outer race 28 is fixed through an intermediation of the resin case 26. The ball 29 is provided between the outer race 28 and the inner race 27.

The resin case 26 fills a clearance between the counter drive-side bearing housing portion 24 and the outer race 28 of the counter drive-side bearing 25 by thermal expansion. The clearance is generated by a difference in thermal expansion between the counter drive-side bearing housing portion 24 and the outer race 28 of the counter drive-side bearing 25 due to heat generation at the time of driving.

Figure 3:
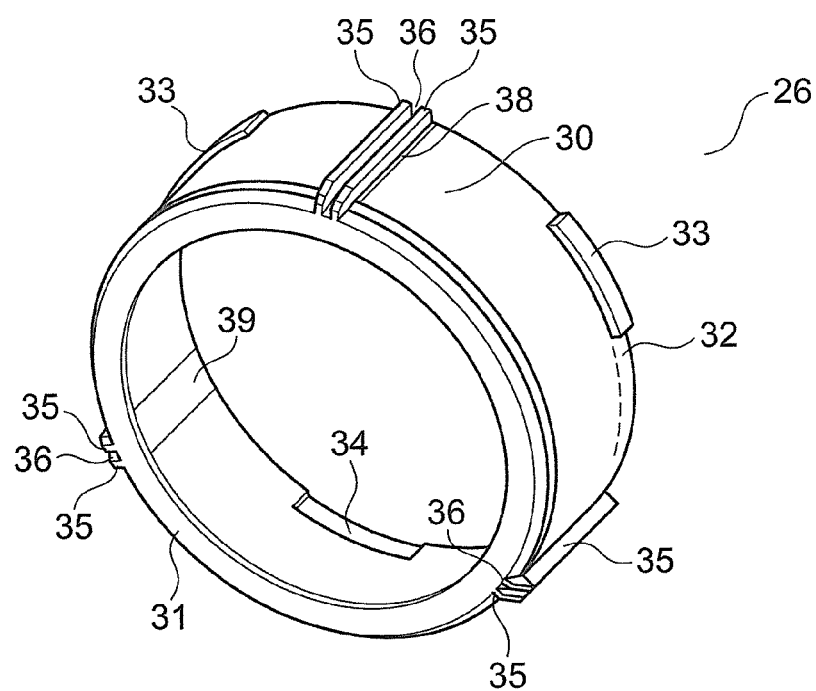
FIG. 3 is a perspective view illustrating the resin case illustrated in FIG. 1.
Figure 4:
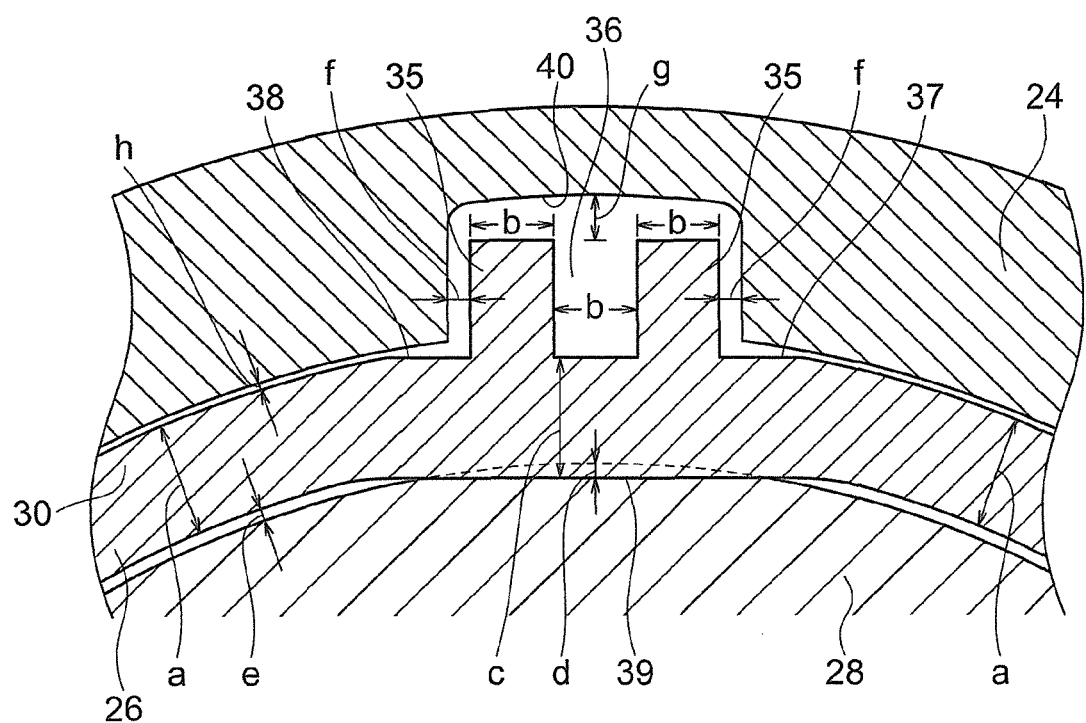
FIG. 4 is a partial front sectional view illustrating the resin case mounted inside the counter drive-side bearing housing portion illustrated in FIG. 1.

FIG. 3 is a perspective view illustrating the resin case 26 illustrated in FIG. 1, and FIG. 4 is a partial front sectional view illustrating the resin case 26 mounted inside the counter drive-side bearing housing portion 24 illustrated in FIG. 1.

The resin case 26, which is a clearance filling member, has a cylindrical shape which extends over the entire axial length of the outer race 28 of the counter drive-side bearing 25. The resin case 26 is made of a polybutyleneterephthalate (PBT) resin.

The resin case 26 includes a case main body portion 30, an extending portion 32, convex portions 33, a locking portion 31, and pairs of ribs 35. The case main body portion 30 is a filling member main body portion, and has a cylindrical shape. The extending portion 32 is formed integrally with the case main body portion 30, and extends beyond an end surface of the outer race 28 on the rotor 6 side toward the rotor 6. The convex portions 33 are formed on an outer circumferential surface of the extending portion 32. The locking portion 31 is an edge portion on the side opposite to the rotor 6, and projects inwardly from the case main body portion 30 in a radial direction. The pairs of ribs 35 are provided on the outer circumferential surfaces of the case main body portion 30 and the extending portion 32 so as to extend over the entire length thereof in the axial direction.

At positions on an inner circumferential surface of the extending portion 32, which correspond to the convex portions 33, concave portions 34 are formed.

A radial thickness a of a case main body including the case main body portion 30 and the extending portion 32 is set smaller than a gap between a diameter of an outer circumference of the outer race 28 and a diameter of an inner circumference of the counter drive-side bearing housing portion 24.

The ribs 35 forming each pair are opposed to each other, and three pairs of the ribs 35 are provided at equal intervals in a circumferential direction on an outer circumferential surface of the case main body.

As illustrated in FIG. 4, a slit 36 is formed between the ribs 35 of each pair, which are opposed to each other. A width of each of the ribs 35 in a circumferential direction and a width of the slit 36 are substantially the same dimension b.

By the slits 36, the occurrence of a so-called shrinkage phenomenon is prevented. The shrinkage phenomenon occurs when a resin material, which is melted at a high temperature, is cooled and solidified. The slits 36 are provide so that the thickness a of the case main body is uniformized to provide a stable function to the case main body.

Flat portions 37 are formed in respective parts of the case main body between the ribs 35 of each pair and at the peripheries thereof. A thickness c between an outer circumferential surface 38 and an inner circumferential surface 39 of each of the flat portions 37 is the same as the thickness a of each of the case main body 30 and the extending portion 32.

The inner circumferential surface 39 of the flat portion 37 has a chord-like shape formed by a line connecting two points on the inner circumferential surface of the case main body. The inner circumferential surface 39 is set so that a distance between the outer circumferential surface of the outer race 28 and the inner circumferential surface 39 of the flat portion 37 has a dimension d (for example, 0.065 mm) so as to constantly press the outer circumferential surface of the outer race 28 at normal temperature.

Moreover, a clearance e (for example, 0.025 mm) is formed between, except for the flat portions 37, the outer circumferential surface of the outer race 28 and the inner circumferential surface of the case main body at normal temperature.

The dimension d and the clearance e described above between the case main body and the outer race 28 are examples for keeping the restriction of the rotation of the outer race 28 about the shaft 5 by constantly pressing the outer circumferential surface of the outer race 28 only by the inner circumferential surface 39 of the flat portion 37 even when a high-temperature state continues.

The ribs 35 provided on the outer circumferential surfaces 38 of the flat portions 37 are brought into engagement with engagement concave portions 40 formed on portions of the counter drive-side bearing housing portion 24, which are respectively opposed to the pairs of ribs 35 in the radial direction. As a result, the rotation of the resin case 26 about the shaft 5 relative to the counter drive-side bearing housing portion 24 is blocked.

A clearance f between the rib 35 and the engagement concave portion 40 in the circumferential direction is, for example, 0.2 mm, whereas a clearance g between the rib 35 and the engagement concave portion 40 in the radial direction is, for example, 0.39 mm.

The above-mentioned examples of the dimensions are set values with which each of the ribs 35 does not abut against the inner circumferential wall surface of the engagement concave portion 40 of the counter drive-side bearing housing portion 24 even when the high-temperature state continues.

A dimension of a clearance h between, except for the outer circumferential surfaces 38 of the flat portions 37, the outer circumferential surface of the case main body and the inner circumferential surface of the counter drive-side bearing housing portion 24 is, for example, 0.014 mm.

Figure 5:
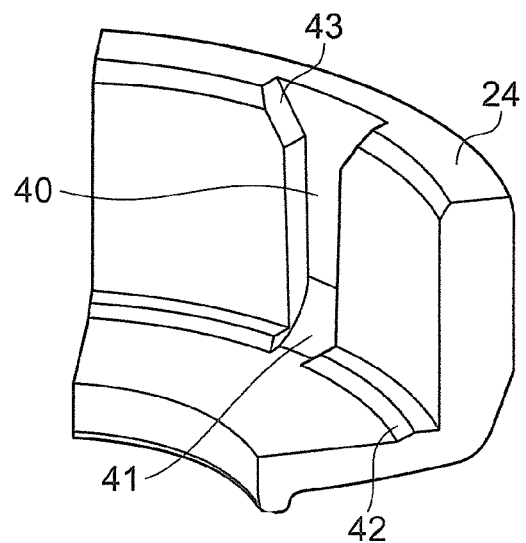
FIG. 5 is a perspective view illustrating a principal part of the counter drive-side bearing housing portion.

FIG. 5 is a perspective view illustrating a principal part of the counter drive-side bearing housing portion 24.

For each of the engagement concave portions 40 formed on the counter drive-side bearing housing portion 24, an abutment portion 41 and a level-difference portion 42 are provided. The abutment portion 41 is formed on a bottom surface side. Distal end surfaces of the ribs 35 abut against the abutment portion 41. The level-difference portions 42 are formed on both sides of the abutment portion 41 in the circumferential direction.

The engagement concave portion 40 is formed to extend from the abutment portion 41 over the entire range in the axial direction. At an inlet of the concave engagement portion 40, a tapered cutout portion 43 is formed as a guide for insertion of the ribs 35.

The resin case 26 is mounted in the counter drive-side bearing housing portion 24 in a state in which the counter drive-side bearing 25 is mounted to the case main body. In this state, the extending portion 32 of the case main body extends beyond the end surface of the outer race 28 of the counter drive-side bearing 25 toward the rotor 6. Therefore, the extending portion 32 is not adjacent to the outer race 28 of the counter drive-side bearing 25 in the radial direction.

The convex portions 33 formed integrally with the extending portion 32 on the outer circumferential surface of the extending portion 32 are formed to be located between the outer circumferential surfaces 38 of the flat portions 37 so as to extend in the circumferential direction. The three arc-like convex portions 33 are formed at equal intervals in the circumferential direction of the extending portion 32.

Figure 6:
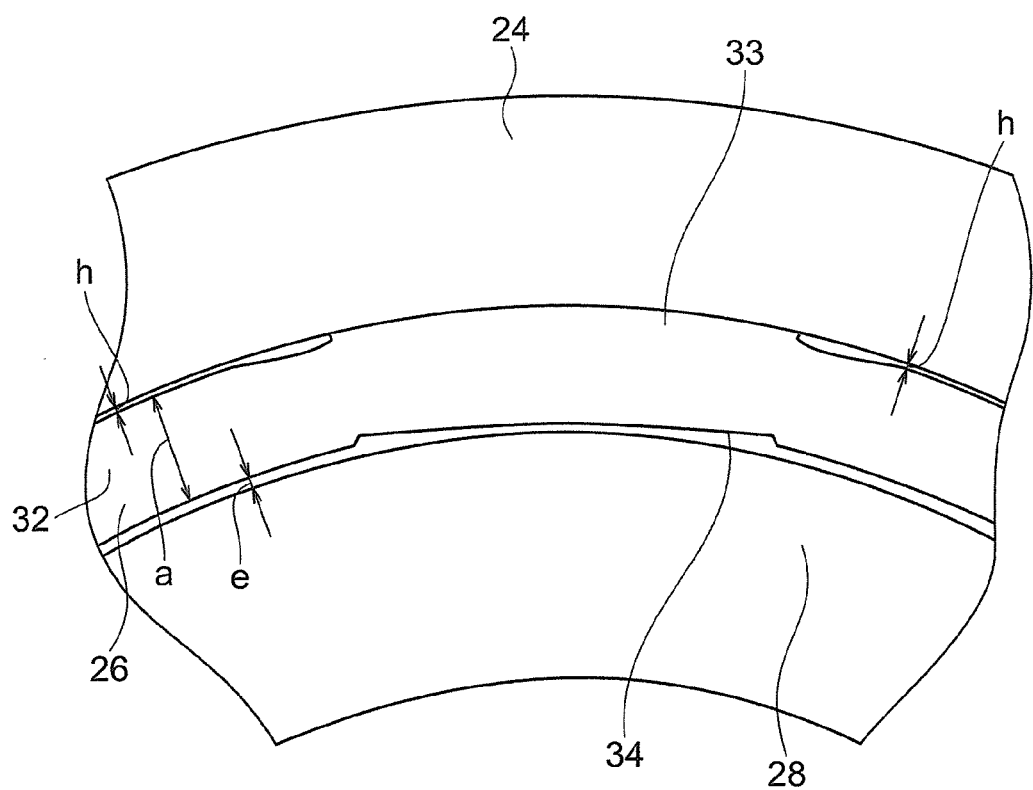
FIG. 6 is a partial front view of the counter drive-side bearing housing portion as viewed from a direction indicated by the arrow A in FIG. 1.

FIG. 6 is a partial front view of the counter drive-side bearing housing portion 24 as viewed from a direction indicated by the arrow A in FIG. 1.

The convex portions 33 press the inner circumferential surface of the counter drive-side bearing housing portion 24 at normal temperature as well as in the high-temperature state. In this manner, the convex portions 33 block the rotation of the resin case 26 about the shaft 5 relative to the counter drive-side bearing housing portion 24.

The convex portions 33 themselves are deformed by press-fitting. At the same time, the inner circumferential surface of the extending portion 32 is inwardly deformed to some extent. However, the convex portions 33 are not formed on the case main body portion 30 but are formed only on the extending portion 32.

Therefore, when the counter drive-side bearing 25 is mounted inside the counter drive-side bearing housing portion 24, the inner circumferential side of the extending portion 32 is not held in contact with the outer race 28 of the counter drive-side bearing 25. By the configuration described above, the deformation of the inner circumferential surface of the extending portion 32 due to the deformation of the convex portions 33 does not affect the counter drive-side bearing 25, in particular, the outer race 28.

Moreover, in contrast to the ribs 35 which do not come into abutment against the inner wall surfaces of the engagement concave portions 40 formed on the counter drive-side bearing housing portion 24 even under the high-temperature state, the convex portions 33 constantly press the inner circumferential surface of the counter drive-side bearing housing portion 24. The convex portions 33 are provided to block the rotation of the resin case 26 about the shaft 5 relative to the counter drive-side bearing housing portion 24. However, when a length of the arc-like convex portions 33 extending in the circumferential direction is too long, the amount of flexural deformation generated when the resin case 26 is inserted into the counter drive-side bearing housing portion 24 becomes small, which inconveniently prevents the resin case 26 from being inserted into the counter drive-side bearing housing portion 24.

The inventor of the present invention has carried out trial manufactures in view of both the block of the rotation of the resin case 26 relative to the counter drive-side bearing housing portion 24 and the ease of insertion of the resin case 26 into the counter drive-side bearing housing portion 24. As a result of the trials, the inventor of the present invention obtained a suitable value of a length of the convex portions 33 in the circumferential direction.

Specifically, the inventor of the present invention has found the following. For example, when the outer diameter of the counter drive-side bearing 25, that is, the outer diameter of the outer race 28 is 35 mm, 6 mm is a suitable value for a total length of the convex portions 33 in the circumferential direction. Ultimately, the total length of the convex portions 33 in the circumferential direction with respect to a total circumferential length of the extending portion 32 suitably falls in the range of about 1/20 to 1/6.

In the case where the convex portions 33 are provided on the extending portion 32, the deformation of the portions of the extending portion 32, on which the convex portions 33 are provided, caused when the resin case 26 is mounted inside the counter drive-side bearing housing portion 24 cannot be assumed. Therefore, there is a risk that uneven concavity and convexity are generated on the inner circumferential surface of the extending portion 32.

To cope with this problem, the concave portions 34 are provided at positions on the inner circumferential surface of the extending portion 32 so as to correspond to the convex portions 33 formed on the outer circumferential surface thereof, as illustrated in FIG. 6. The clearance e is ensured between the outer race 28 and the inner circumferential surface of the extending portion 32.

In the rotating electric machine having the configuration described above, a current is supplied from a battery (not shown) through the brushes 12 and the slip ring 11 to the rotor coil 15 of the rotor 6 to generate a magnetic flux. As a result, the N-pole is generated in the claw-like magnetic pole 16 of the rotor 6, whereas the S-pole is generated in the claw-like magnetic pole 17 of the rotor 6.

On the other hand, the pulley 4 is driven by an engine (not shown). The rotor 6 is rotated by the shaft 5 to apply a rotating magnetic field to the stator core 18. As a result, an electromotive force is generated in the stator coil 19.

The magnitude of the AC electromotive force is regulated by the voltage regulator 14 for regulating the voltage of the current flowing through the rotor coil 15.

An AC current generated by the AC electromotive force passes through the rectifier 13 to be rectified into a DC current which in turn charges the battery.

The counter drive-side bearing 25 is housed inside the counter drive-side bearing housing portion 24 of the counter drive-side bracket 2 on which the rectifier 13 and the voltage regulator 14 corresponding to heat-generating components are provided.

Therefore, the heat generated from the heat-generating components is transferred to the counter drive-side bearing 25 through the counter drive-side bearing housing portion 24 on the counter drive-side. Moreover, the heat generated from the rotor coil 15 is transferred to the shaft 5 through the claw-like magnetic poles 16 and 17, and is then transferred to the outer race 28 of the counter drive-side bearing 25. As a result, the counter drive-side bearing housing portion 24, the resin case 26, and the outer race 28 of the counter drive-side bearing 25 thermally expand.

The counter drive-side bearing housing portion 24 is made of aluminum, whereas the outer race 28 of the counter drive-side bearing 25 is made of carbon steel. Therefore, the above-mentioned components thermally expand in such a way that the gap between the counter drive-side bearing housing portion 24 and the outer race 28 of the counter drive-side bearing 25 is increased.

On the other hand, because of its large linear expansion coefficient, the resin case 26, which is the clearance filling member, thermally expands to fill the gap between the counter drive-side bearing housing portion 24 and the outer race 28 of the counter drive-side bearing 25. Therefore, a coupling force between the counter drive-side bearing housing portion 24 and the outer race 28 of the counter drive-side bearing 25 through the resin case 26 is ensured.

Specifically, even when the inner circumferential surfaces 39 of the flat portions 37 of the resin case 26 is subjected to the heat from the heat-generating components to be placed in the high-temperature state, the inner circumferential surfaces 39 continue pressing the outer race 28 at all the positions (three positions in this embodiment) of the resin case 26, at which the inner circumferential surfaces 39 are provided. Therefore, the rotation of the resin case 26 and the outer race 28 relative to each other does not occur.

Moreover, the ribs 35 provided on the resin case 26 also thermally expand at the high temperature both in the radial direction and the circumferential direction. The dimensions of the clearance f and the clearance g are set so that the ribs 35 are not brought into pressure contact with the inner wall surfaces of the engagement concave portions 40 of the counter drive-side bearing housing portion 24.

Each of the ribs 35 faces the inner wall surface of a corresponding one of the engagement concave portions 40 of the counter drive-side bearing housing portion 24 through a predetermined extremely small gap therebetween.

As a result, when the shaft 5 rotates, the ribs 35 provided on the resin case 26 come into abutment against radial inner surfaces of the engagement concave portions 40 on the forward side in the direction of rotation, thereby blocking the rotation of the resin case 26 relative to the counter-drive side bearing housing portion 24.

The convex portions 33 formed on the outer circumferential surface of the extending portion 32 press the inner circumferential surface of the counter drive-side bearing housing portion 24 at normal temperature as well as at the high temperature. Therefore, the rotation of the resin case 26 about the shaft 5 relative to the counter drive-side bearing housing portion 24 is primarily blocked. However, even when the resin case 26 is going to rotate, the rotation of the resin case 26 can be more reliably blocked by the ribs 35 loosely inserted into the engagement concave portions 40.

With the AC generator for a vehicle according to the first embodiment, the resin case 26 includes the case main body portion 30 having the cylindrical shape and having the radial thickness smaller than the clearance between the outer circumferential wall surface of the outer race 28 of the counter drive-side bearing 25 and the inner circumferential wall surface of the counter drive-side bearing housing portion 24, the extending portion 32 formed integrally with the case main body portion 30, which extends toward the rotor 6 beyond the end surface of the counter drive-side bearing 25 housed inside the counter drive-side bearing housing portion 24, and the convex portions 33 formed on the outer circumferential surface of the extending portion 32 to extend in the circumferential direction to form an arc-like shape, the convex portions 33 being configured to be held in pressure contact with the inner circumferential wall surface of the counter drive-side bearing housing portion 24.

Therefore, the resin case 26 inserted into the counter drive-side bearing housing portion 24 is deformed and displaced inwardly in the radial direction through an intermediation of the convex portions 33. By the elastic force of the resin case 26, the rotation of the resin case 26 relative to the counter drive-side bearing housing portion 24 is restricted. Therefore, the rotation of the resin case 26 relative to the counter drive-side bearing housing portion 24 can be restricted with the simple configuration.

Moreover, the above-mentioned deformation and displacement of the resin case 26 occurs in the region which is not held in contact with the outer race 28 of the counter drive-side bearing 25. Therefore, the outer race 28 is not adversely affected by the deformation and displacement, resulting in enhanced reliability of the AC generator for a vehicle.

Moreover, the three convex portions 33 are formed at equal intervals in the circumferential direction. Therefore, the convex portions 33 provided on the resin case 26 are uniformly brought into pressure contact with the inner circumferential wall surface of the counter drive-side bearing housing portion 24 in the circumferential direction. Therefore, the resin case 26 is stably mounted within the counter drive-side bearing housing portion 24.

Further, the total length of the convex portions 33 in the circumferential direction is set to fall within the range of 1/20 to 1/6 with respect to the total circumferential length of the extending portion 32. Therefore, the rotation of the resin case 26 relative to the counter drive-side bearing housing portion 24 is restricted, while the resin case 26 is easily inserted into and mounted within the counter drive-side bearing housing portion 24.

Moreover, the concave portions 34 are formed at the positions on the inner circumferential surface of the extending portion 32, which correspond to the convex portions 33. The concave portions 34 are separated away from the outer race 28 when the counter drive-side bearing 25 is inserted into the resin case 26.

Therefore, owing to the concave portions 34, in particular, the outer race 28 is prevented from being affected by the deformation and displacement of the extending portion 32 to the inner circumferential side, caused by the convex portions 33 provided on the resin case 26 mounted inside the counter drive-side bearing housing portion 24 when, in particular, the counter drive-side bearing 25 passes over the extending portion 32 to be mounted inside the counter drive-side bearing housing portion 24.

Moreover, the resin case 26 includes the flat portions 37 having the flat inner circumferential surfaces 39, which press the outer race 28. Therefore, the rotation of the resin case 26 and the outer race 28 relative to each other is blocked with a simple configuration.

Further, each of the flat inner circumferential surfaces 39 of the flat portions 37 has the chord-like shape formed with the line connecting two points on the inner circumferential surface of the resin case 26, and therefore can be easily formed.

Moreover, the flat portions 37 are formed at the three positions at equal intervals in the circumferential direction. Therefore, the rotation of the resin case 26 and the outer race 28 relative to each other can be more reliably blocked.

Further, the ribs 35, which project in the radial direction and are held in engagement with the engagement concave portions 40 formed on the counter drive-section bearing housing portion 24, are provided on the flat portions 37 of the resin case 36. Therefore, the rotation of the resin case 26 relative to the counter drive-side bearing housing portion 24 can be reliably restricted with the simple configuration.

Moreover, the ribs 35 are formed in pairs so that the ribs 35 of each pair are opposed to each other through the slit 36 therebetween in the circumferential direction. Therefore, the occurrence of a so-called shrinkage phenomenon, which occurs when the resin material melted at a high temperature is cooled and solidified, is prevented. Therefore, the thickness a of the case main body can be uniformized.

Second Embodiment

Figure 7:
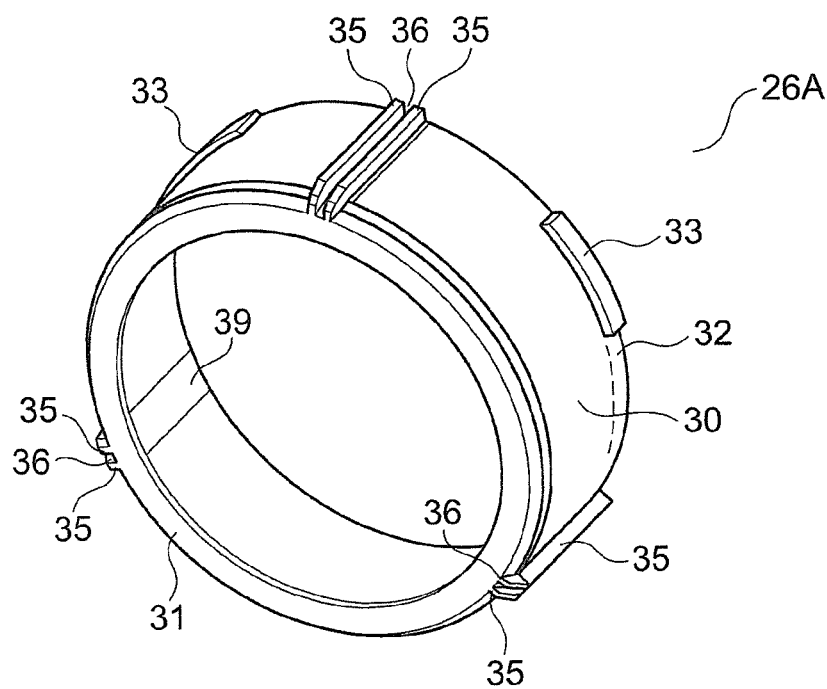
FIG. 7 is a perspective view illustrating a resin case incorporated into an AC generator for a vehicle according to a second embodiment of the present invention.

FIG. 7 is a perspective view illustrating a resin case 26A incorporated into an AC generator for a vehicle according to a second embodiment of the present invention.

Although the concave portions 34 formed on the inner circumferential surface of the extending portion 32 of the first embodiment are not provided in the second embodiment, a clearance is formed even between the portions of the inner circumferential surface of the extending portion 32, which correspond to the convex portions 33, and the outer circumferential surface of the outer race 28.

The clearance can be adjusted by adjusting the length of the convex portions 33 in the circumferential direction, the radial thickness of the convex portions 33, and the like.

The remaining configuration is the same as that of the AC generator for a vehicle according to the first embodiment.

Thus, the AC generator for a vehicle according to the second embodiment is equivalent to the AC generator for a vehicle according to the first embodiment in that the counter drive-side bearing 25 mounted inside the resin case 26A is not affected by the deformation and displacement of the portions of the inner circumferential surface of the extending portion 32, which correspond to the convex portions 33, caused by the resin case 26 A pressed into the counter drive-side bearing housing portion 24.

Further, the adverse effects on the outer race 28 at the time of mounting of the counter drive-side bearing 25 inside the resin case 26A are prevented by sufficiently adjusting the length of the convex portions 33 in the circumferential direction, the radial thickness of the convex portions 33, and the like.

With the AC generator for a vehicle according to the second embodiment, the same effects as those obtained by the first embodiment can be obtained. In addition, in comparison with the resin case 26 of the first embodiment, a molding die for the resin case 26A is simplified to reduce manufacturing cost because of the absence of the concave portions 34.

Third Embodiment

Figure 8:
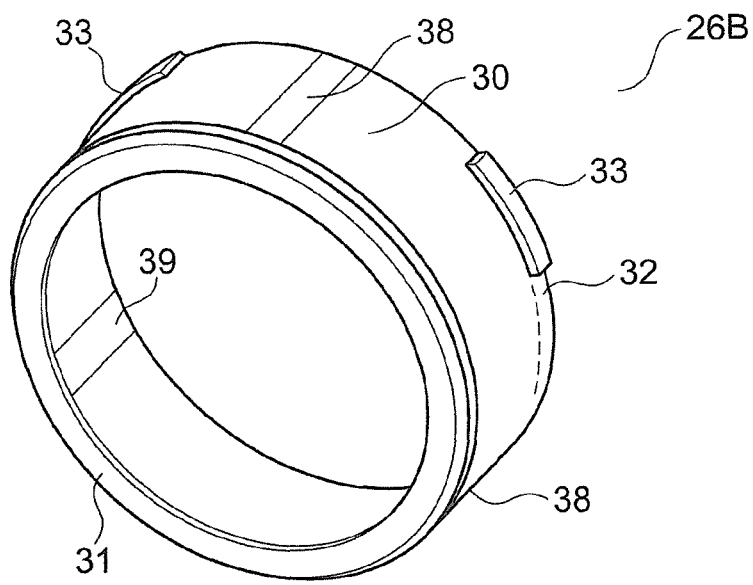
FIG. 8 is a perspective view illustrating a resin case incorporated into an AC generator for a vehicle according to a third embodiment of the present invention.

FIG. 8 is a perspective view illustrating a resin case 26B incorporated into an AC generator for a vehicle according to a third embodiment of the present invention.

In the third embodiment, the ribs 35, which are provided on the flat portions 37 of the resin case 26A in the second embodiment, are not provided.

The remaining configuration is the same as that of the AC generator for a vehicle according to the second embodiment.

In the third embodiment, the convex portions 33 formed on the outer circumferential surface of the extending portion 32 constantly press the inner circumferential surface of the counter drive-side bearing housing portion 24 at normal temperature as well as at the high temperature. Therefore, the rotation of the resin case 26B about the shaft 5 relative to the counter drive-side bearing housing portion 24 is blocked.

By adjusting the length of the convex portions 33 in the circumferential direction, the radial thickness of the convex portions 33, and the like, the rotation of the resin case 26B relative to the counter drive-side bearing housing portion 24 can be blocked by the convex portions 33 alone.

With the AC generator for a vehicle according to the third embodiment, the same effects as those obtained by the second embodiment can be obtained. In addition, in contrast to the resin case 26A of the second embodiment, the ribs 35 are not provided on the resin case 26B. Therefore, when the resin case 26B is inserted into the counter drive-side bearing housing portion 24, the alignment of the resin case 26B in the circumferential direction with respect to the counter drive-side bearing housing portion 24 is not required. Therefore, the resin case 26B can be easily mounted inside the counter drive-side bearing housing portion 24 without requiring time.

Further, a molding die for the resin case 26B is simplified to reduce manufacturing cost.

Although the AC generator for a vehicle has been described as the rotating electric machine in each of the embodiments described above, the AC generator for a vehicle is merely an example. The rotating electric machine may also be an AC generator for other than a vehicle or an electric motor.

Moreover, the examples where the resin cases 26, 26A, and 26B are provided on only one side of the shaft 5 as the clearance filling member for filling, by thermal expansion, the clearance between the bearing housing portion and the outer race of the bearing have been described. However, the clearance filling members may be provided on both sides of the shaft.

Further, the convex portions 33 are not necessarily required to be formed over the entire axial range of the extending portion 32 of each of the resin cases 26, 26A, and 26B.

Further, the number of the convex portions 33 and the number of the ribs 35 described above are merely examples, and the numbers are not limited to those described above.

Further, the ribs 35 are not necessarily required to be provided on the flat portions 37. The ribs 35 of each pair are not required to be provided so as to be opposed to each other through the slit 36 therebetween. Further, the ribs 35 are not required to extend over the entire axial range of the case main body including the case main body portion 30 and the extending portion 32. The ribs 35 may have a short axial length or may be discontinuous.

What is claimed is:

1. Rotating electric machine, comprising:
    a shaft;
    a rotor fixed to the shaft;
    bearings provided rotatably to the shaft on both sides of the rotor, for rotationally supporting the rotor; and
    a bracket including a bearing housing portion into which corresponding one of the bearings is pressed through an intermediation of a clearance filling member,
    wherein the clearance filling member comprises:
        a filling-member main body portion having a cylindrical shape and having a radial thickness smaller than a clearance between an outer circumferential wall surface of an outer race of the corresponding one of the bearings and an inner circumferential wall surface of the bearing housing portion;
        an extending portion formed integrally with the filling-member main body portion, the extending portion extending toward the rotor beyond an end surface of the corresponding one of the bearings housed inside the bearing housing portion; and
        a convex portion formed at at least one position on an outer circumferential surface of the extending portion to extend in a circumferential direction to form an arc-like shape, the convex portion being configured to be brought into pressure contact with the inner circumferential wall surface of the bearing housing portion.

2. A rotating electric machine according to claim 1, wherein a plurality of the convex portions are formed at equal intervals in the circumferential direction.

3. A rotating electric machine according to claim 1, wherein a total length of the convex portion in the circumferential direction is set to fall within a range of 1/20 to 1/6 with respect to a total circumferential length of the extending portion.

4. A rotating electric machine according to claim 1, wherein the extending portion includes a concave portion formed on an inner circumferential surface at a position corresponding to the convex portion.

5. A rotating electric machine according to claim 4, wherein the concave portion is separated away from the outer race when the corresponding one of the bearings is inserted in the clearance filling member.

6. A rotating electric machine according to claim 1, wherein the filling-member main body portion includes at least one flat portion having a flat inner circumferential surface, the flat portion pressing the outer race.

7. A rotating electric machine according to claim 6, wherein the flat inner circumferential surface of the flat portion has a chord-like shape formed by a line connecting two points on an inner circumferential surface of the filling-member main body portion.

8. A rotating electric machine according to claim 6, wherein a plurality of the flat portions are formed at equal intervals in the circumferential direction.

9. A rotating electric machine according to claim 6, wherein the clearance filling member includes a rib projecting in the radial direction, the clearance filling member being provided on the flat portion to be engaged with an engagement concave portion formed on the bearing housing portion.

10. A rotating electric machine according to claim 9, wherein a pair of the ribs is formed so that the ribs are opposed to each other through a slit therebetween in the circumferential direction.

11. A rotating electric machine according to claim 1, wherein the clearance filling member comprises a resin case.

12. A rotating electric machine according to claim 1, wherein the rotating electric machine comprises an AC generator for a vehicle.

13. A rotating electric machine according to claim 12, wherein the corresponding one of the bearings comprises a counter drive-side bearing for rotationally supporting an end of the shaft on a side opposite to a pulley fixed to another end of the shaft and to be driven by an engine.

* * * * *